No. 886,296. PATENTED APR. 28, 1908.
G. M. HOWATSON.
CROSSCUT SAW.
APPLICATION FILED APR. 26, 1907.

WITNESSES:
A. D. Gerking.
Cecil Long.

INVENTOR:
George M. Howatson
by F. J. Geisler
ATT'Y.

UNITED STATES PATENT OFFICE.

GEORGE M. HOWATSON, OF CLATSKANIE, OREGON.

CROSSCUT-SAW.

No. 886,296.　　　Specification of Letters Patent.　　　Patented April 28, 1908.

Application filed April 26, 1907. Serial No. 370,503.

*To all whom it may concern:*

Be it known that I, GEORGE M. HOWATSON, a citizen of the United States, and a resident of Clatskanie, Columbia county, Oregon, have invented a new and useful Improvement in Crosscut-Saws, of which the following is a specification, reference being had to the accompanying drawings as constituting a part thereof.

This invention has for its object to obtain a saw which is provided with improved cutting-teeth, each thereof to consist of two smaller cutting points or teeth instead of a single larger cutting-tooth; and including other features enabling the same to do the work better than the single larger cutting teeth, and to remain in a good condition for a greater length of time than the latter.

Figure 1:
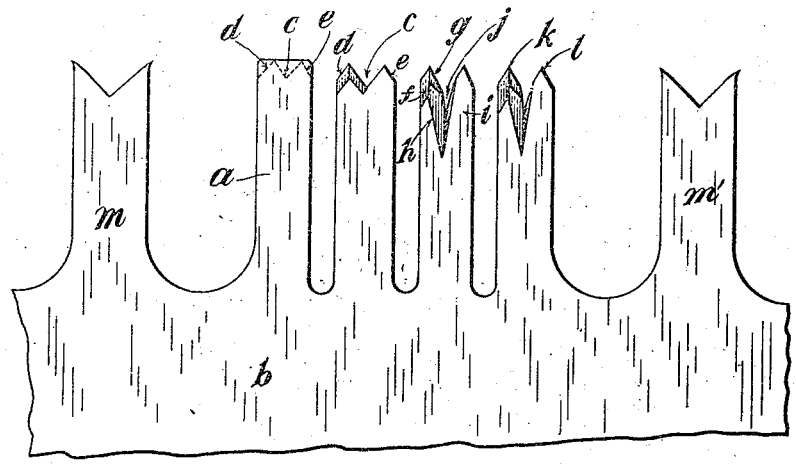
Figure 3:
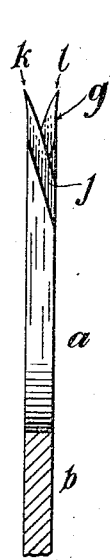
Figure 4:
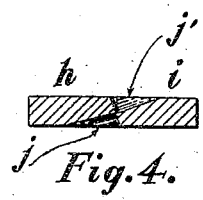
Figure 5:
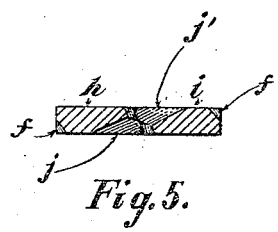
Figure 2:
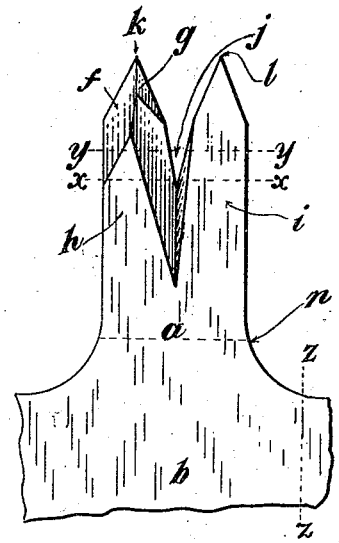

I attain my object by the construction illustrated in said accompanying drawings, in which, Figure 1 is an elevation of a part of a saw blade embodying my invention, showing the blank member out of which one pair of cutting teeth is to be made; the contiguous pair of cutting teeth are shown in partly finished state, and the remaining cutting-teeth as finished; Fig. 2 is an enlarged view of one pair of improved cutting-teeth finished, ready for work; Fig. 3 is a cross section, agreeing in size with Fig. 2, and taken approximately on a line $z$—$z$ thereof; and Figs. 4 and 5 are plan sections, the former taken on a line indicated by $x$—$x$, and the latter on a line $y$—$y$ of Fig. 2.

Referring now to the letters as designating the parts described: The saw-tooth blank $a$, of the saw blade $b$, is cut in the first instance with a V-shaped groove $c$, (see Fig. 1) and then the angular edges $d$, $e$, are made. I then file the angular surfaces $f$, $g$, on the opposite interior faces of the members $h$, $i$, and finally by means of a file make the deep V-grooves $j$, $j'$, the result being that the base of the blank $a$ becomes the common root of the cutting-tooth members $h$, $i$, and the tips of the latter providing cutting points $k$, $l$, which are finally slightly set outward, approximately as shown in Fig. 3. The raker-teeth $m$, $m'$ are made as usual, but in my saw the same are made a trifle longer than usual. That is, while in any cross-cut saw the rakers must be shorter than the cutting-teeth, the difference in length between the rakers and cutting-teeth in my saw must not exceed from 1/64 to 1/32 of an inch. The described construction gives the members $h$, $i$, sufficient resiliency, at the same time leaves them stiffer, or more rigid than would a single cutting-tooth extending from the tips $k$, $l$, down to the dotted root line $n$, shown in Fig. 2.

In the old style cutting-tooth, of the cross-cut saws heretofore in use, if the saw blade is pressed or pinched very hard between the walls of the timber being cut, they would soon, more or less, lose their set, being forced back into straight alinement, and consequently rendered more or less ineffective for good work; while in my improved construction, the cutting-teeth, being comparatively short, would sink into the compressing walls of the timber being cut for the moment, and as soon as released, would spring back into their normal state. The opposite deep grooves $j$, $j'$ cause the cutting-teeth to keep clear of saw dust.

It will also be found that my cutting-teeth will cut through a knot in the timber without injury, while the common long cutting-tooth is very apt to be sprung out of place.

By reason of having doubled the number of cutting-teeth and made them of the construction described, each thereof has a smaller portion of the work to do; and this fact, together with their described construction, enables the same to remain in good working condition for a longer interval than the common cutting-teeth of the cross-cut saws heretofore in use.

I claim:

1. In a cross-cut saw, cutting-teeth arranged in pairs and having a common integral root or base connecting the same with the body of the saw-blade, said cutting-teeth being divided from each other by deep V-shaped vertical grooves cut in from the opposite or outer faces of the saw, each of said cutting grooves comprising a wide flat face and a narrower face of acuter angle, the wide face of one V-shaped groove being made opposite to the narrow face of the opposite groove, and opposite angular faces on the cutting points of the teeth, on the same face as the wide face of said V-shaped grooves.

2. In a cross-cut saw, cutting-teeth arranged in pairs and having a common integral root or base connecting the same with the body of the saw-blade, said cutting-teeth being divided from each other by deep V-shaped vertical grooves cut in from the opposite or outer faces of the saw, each of said cutting grooves comprising a wide flat face and a narrower face of acuter angle, the wide face of one V-shaped groove being made opposite to the narrow face of the opposite groove, and opposite angular faces on the cutting points of the teeth, on the same face as the wide face of said V-shaped grooves, in combination with rakers having only a slightly lesser length than such cutting-teeth, measuring from their common base or root.

3. In a cross-cut saw, the combination of cutting-teeth arranged in pairs and having a common integral root or base connecting the same with the body of the saw-blade, said cutting-teeth being divided from each other by deep V-shaped vertical grooves cut in from the opposite or outer faces of the saw, each of said cutting grooves comprising a wide flat face and a narrower face of acuter angle, the wide face of one V-shaped groove being made opposite to the narrow face of the opposite groove, and opposite angular faces on the cutting points of the teeth, on the same face as the wide face of said V-shaped grooves, and raker teeth arranged between each set of eight cutting-teeth, said rakers being only of slightly lesser length than such cutting-teeth, measuring from their common base or root.

GEORGE M. HOWATSON.

Witnesses:
C. H. WHEELER,
Z. J. GEISLER.